Figure 1:
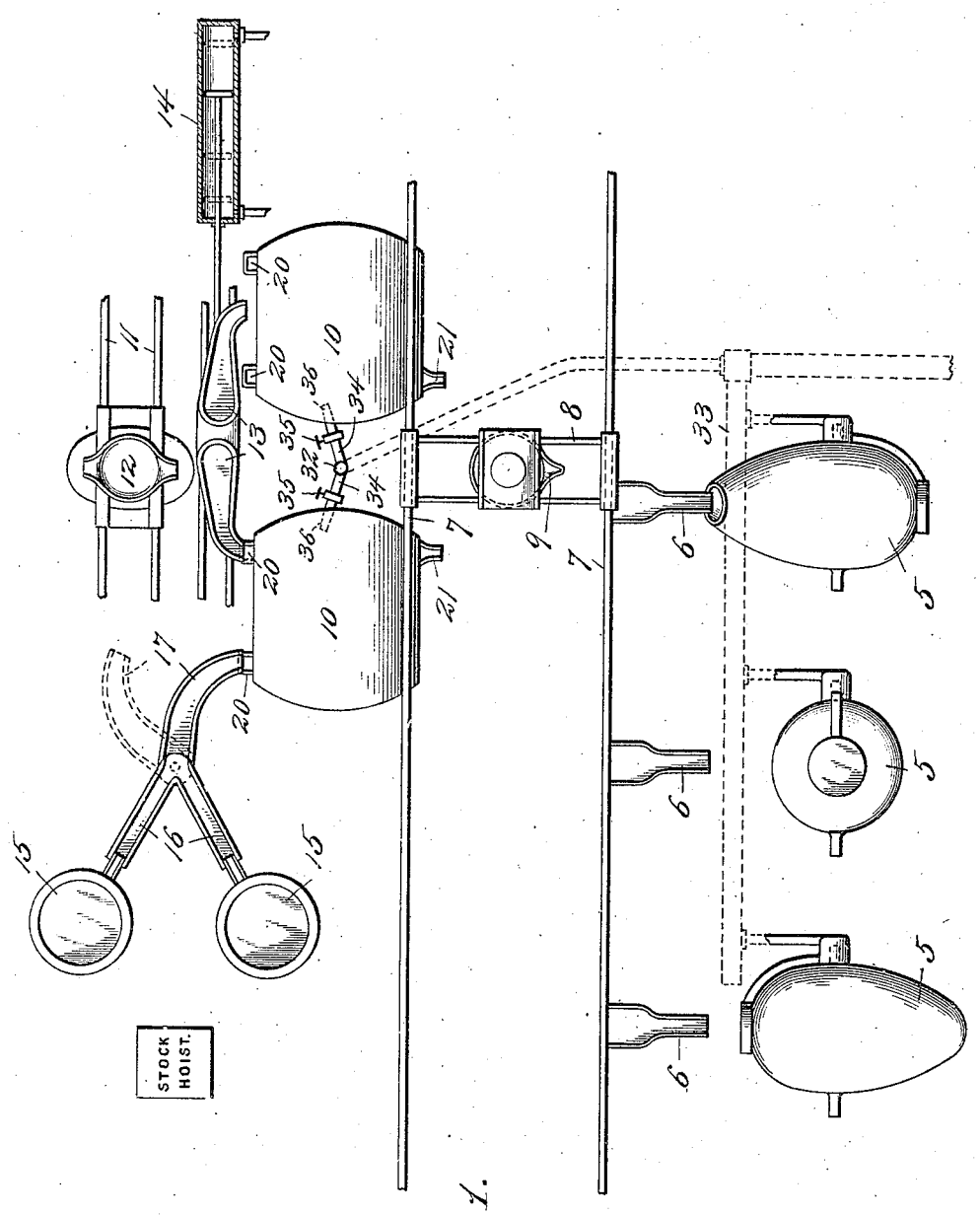

No. 843,582. PATENTED FEB. 12, 1907.
H. H. CAMPBELL.
CONVERTER PLANT.
APPLICATION FILED NOV. 22, 1904.

3 SHEETS—SHEET 1.

Witnesses.
Harry L. Amer.
W. Sommers

Inventor.
Harry Huse Campbell.
by Henry Orth Jr.
attys.

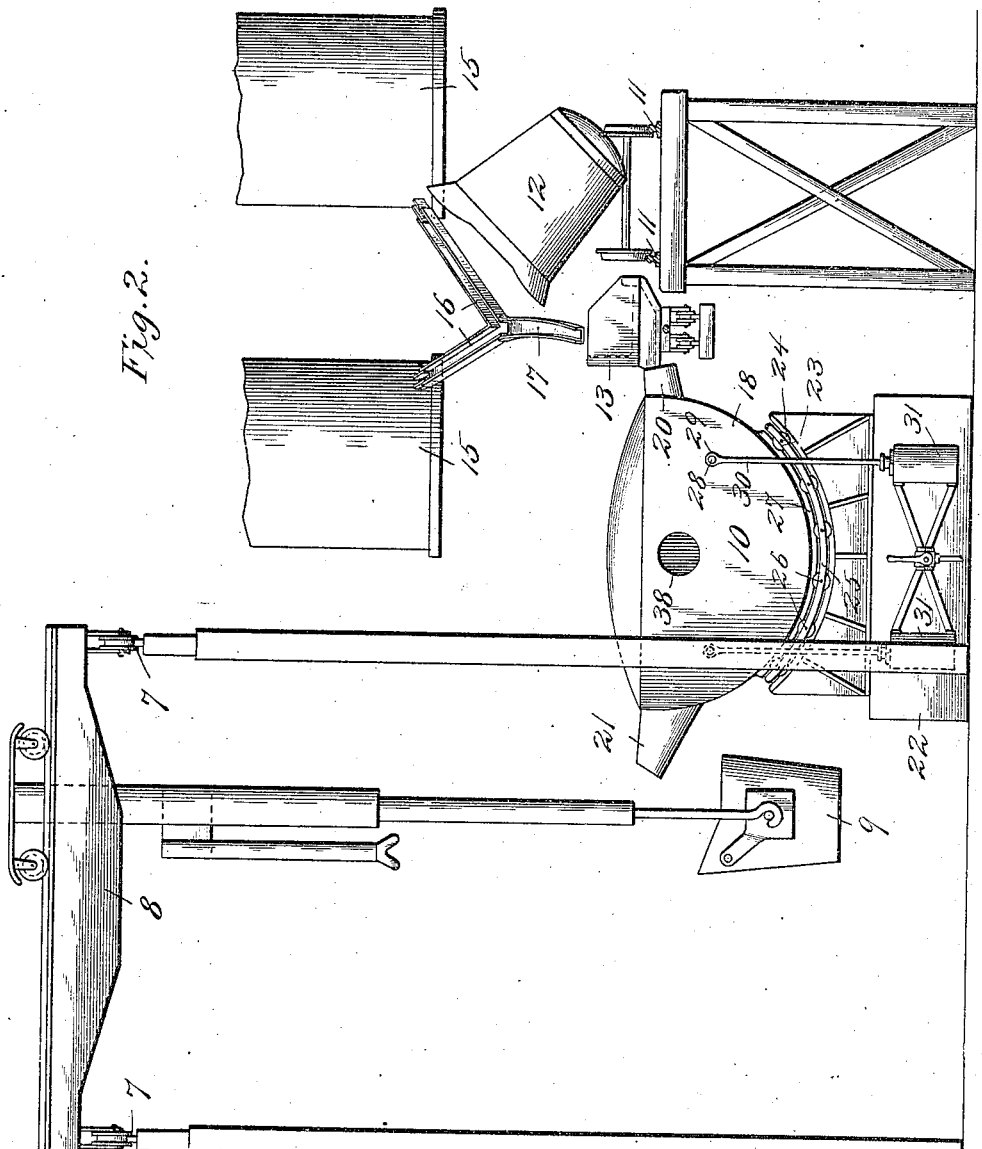

No. 843,582.
PATENTED FEB. 12, 1907.
H. H. CAMPBELL.
CONVERTER PLANT.
APPLICATION FILED NOV. 22, 1904.
3 SHEETS—SHEET 3.
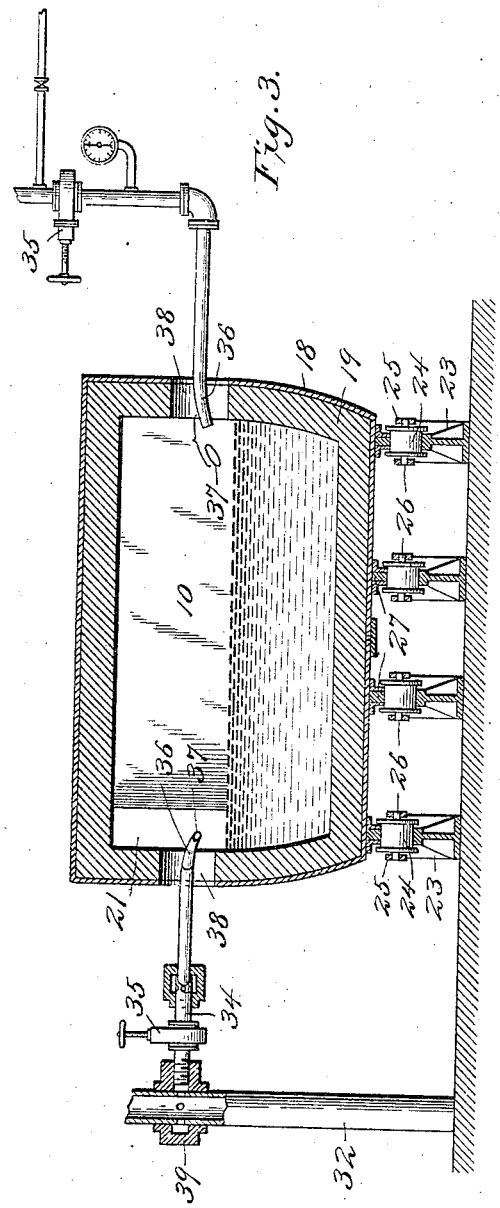
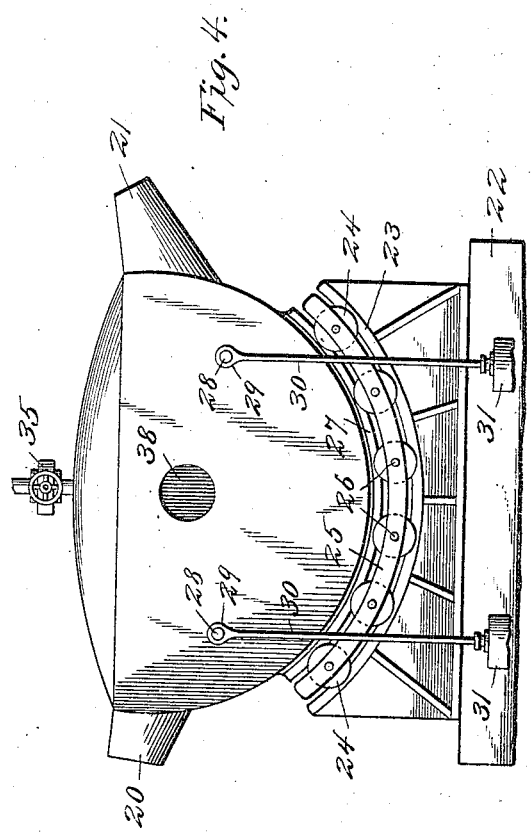
Witnesses.
Harry L. Amer.
O. M. Sommers.
Inventor.
Harry Huse Campbell.
by Henry Orth &co.
attys.

UNITED STATES PATENT OFFICE.

HARRY H. CAMPBELL, OF STEELTON, PENNSYLVANIA.

CONVERTER PLANT.

No. 843,582.      Specification of Letters Patent.      Patented Feb. 12, 1907.

Application filed November 22, 1904. Serial No. 233,857.

*To all whom it may concern:*

Be it known that I, HARRY HUSE CAMPBELL, a citizen of the United States of America, residing at Steelton, in the county of Dauphin and State of Pennsylvania, United States of America, have invented certain new and useful Improvements in Converter Plants; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to converter plants or plants for the conversion of melted iron into steel and of appliances for attaining this end in such relative relation to each other that time is saved and economy of production is attained, and more particularly to the construction of a receiving-receptacle for molten iron, wherein the iron is retained until convenient for use in converters or open-hearth furnaces, and in the relation of said receiver to other parts of the plant, together with means for keeping the receiver clean or free from accretions adhering to its lining, as well as to keep the metal in a molten state until ready for charging into the converters or open-hearth furnaces.

Referring to the drawings, in which like parts are similarly designated, Figure 1 is a diagrammatic plan view of so much of a Bessemer steel plant as will be necessary to a full understanding of my invention. Fig. 2 is an elevation of the same. Fig. 3 is a section through the receiver. Fig. 4 is a side elevation of the same.

In the manufacture of steel in a Bessemer plant molten iron is charged into vessels called "converters" to be decarburized, desiliconized, &c., by the action of a blast of cold air. The molten iron is sometimes derived from pig-iron that has been melted in cupolas conveniently placed near the converters, and is sometimes brought in a molten state direct from the blast-furnaces in transfer-ladles.

Inasmuch as the iron has to be tapped from a blast-furnace at such times and in such quantity as may be necessary for the proper economic operation of the blast-furnace and is generally transported to the steel plant as soon as practicable to avoid loss of heat, the molten pig-iron is liable to reach the steel plant or is ready for use at times when it is impracticable to charge it into converters. I have found it expedient to provide one or more receivers into which the transfer-ladles can promptly empty their contents of molten metal so as to return promptly to the blast-furnace. These receivers are therefore adapted to hold the molten iron in considerable quantity until it can be used in the converters, while fresh charges from the blast-furnace are liable to be received before the molten iron in the receivers can be used. Hence it follows that the receivers must be used without opportunity for cleaning or repair for as long periods of time as the steel plant continues in operation.

As the molten pig-iron flows out from the blast-furnace into the transfer-ladles it is frequently accompanied by more or less "kish," a plumbago-like substance that often forms in blast-furnaces, and other substances more or less silicious. In transferring the molten iron into the receivers these substances pass in with it, remain at or near the surface of the molten metal, and accumulate, often becoming attached to the walls of the receiver, and at all times promoting the formation of slag, metal skulls, and other accretions on the walls of the receiver. The removal of such accretions by mechanical means, as by bars, chisels, &c., is very difficult and often liable to result in injury to the refractory linings of the receivers that keep the molten metal from contact with the metallic structure thereof, so that it has not been practicable to effect the removal of the accretions referred to to any adequate extent while the receiver is in use.

When the receiver is out of use and cold, the cleaning of the accretions of slag and skulls is also quite difficult, tedious, and expensive and generally necessitates considerable repairing of the refractory lining to which the accretions have adhered. Thus it will be understood that any effectual means of preventing the accretion of kish, slag, or skulls on the walls of the receiver, without mechanically removing them, and thereby enabling the continuous and prolonged use of the receivers, is of very considerable importance in the production of steel where receivers are employed.

Referring now to the drawings, the plan view, Fig. 1, shows a Bessemer-steel plant, with converters 5 in customary relation to each other, elevated fixed troughs or runners 6 placed behind the converters and under an elevated runway 7 of a traveling crane 8, that carries a charging-ladle 9, by means of which molten iron is delivered to the converters. Adjacent this runway 7 are mounted one or more receivers 10, two being shown, and in close proximity to them is the track 11, on which runs the transfer-ladle car 12, that moves the molten metal from the blast-furnace into the steel plant, the metal being discharged into the receivers by the aid of longitudinally-movable receiver-runners 13, properly placed for the purpose. These runners are moved by a hydraulic or air cylinder and piston 14, so that metal can be discharged from the transfer-ladle 12 into either one of the receivers without changing the position of the ladle-car 12 on its track 11.

The cupolas 15 placed near the receivers and provided with fixed runners 16 uniting at their ends and discharging into a cupola-receiver runner 17, that is mounted to be swung out of the way when not required, thereby enabling the contents of the cupolas 15 to be run into the receiver 10.

The receiver 10 comprises a metallic built-up casing or envelop 18, having a refractory lining 19, provided with preferably, but not necessarily, two receiving-spouts 20, a discharging-spout 21, and openings 38 in the sides in or about the axis of rotation of the receiver. On the bed 22 of the receiver is a set of circular or curved rails 23, on which are flanged rollers 24, held in their relative distances apart by plates 25, in which the axles 26 of the rollers 24 are journaled. On the bottom of the receiver are rails 27, that rest on the rollers.

On the side of the receiver, or on both sides, if necessary, are pins 28 with which engage eyes 29 of flexible piston-rods 30, reciprocated from pneumatic or hydraulic cylinders 31, secured to the bed 22 of the receiver. The structure of these cylinders and pistons are those commonly used in connection with steel plants, and therefore need no detailed description. By means of this device or devices the receiver is tipped to pour part of its metal contents into the charging-ladle 9 through the pouring-spout 21.

In proximity to the axis of rotation of the receiver and preferably between the two receivers I place a blast-pipe 32 to conduct a strong blast, preferably from the cold-blast mains 33, for supplying air to the Bessemer converters 5. Branches 34 from this blast-pipe 32 are provided with valves 35, from which nozzles 36, having preferably, but not necessarily, a substantially elliptical discharge-orifice 37. These nozzles extend freely through the openings 38 into the receiver, and since they are in or about in the axis of rotation or tip of the receiver and considerably larger than the nozzles they will not interfere with the pouring of metal from the receiver to the charging-ladle.

The necks of valves 35 will be preferably arranged to swivel horizontally, as shown at 38, and the nozzles 36, attached to the valves by connections 37, arranged to swivel vertically, by which means the direction of the delivery of the blast can be controlled and delivered at any desired point of the surface of the molten metal. Any other method of conducting the blast by which the direction of delivery of the blast into the receiver can be varied vertically or horizontally may be used as may be found practicable and convenient.

I have shown in Fig. 1 each receiver provided with a single-blast nozzle 36; but in the detailed construction, Fig. 3, I have shown two such nozzles for a receiver diametrically opposite and in or about in the axis of rotation of the receiver, one of them stationary and the other movable. When desired, other nozzles can be inserted at various points of the periphery, as the particular plant using such receivers demand or admit, according to the size of the receiver, quantity and pressure of blast, and the quantity of metal to be held in the receiver.

It will be observed that I have spoken of "adjustable" nozzles, and although such are desirable, so that the blast can be directed in any portion of the receiver and adjusted for various levels of the molten contents, fixed nozzles can also be used, but when used, preferably like the adjustable nozzles, do not direct the blast radially into the receiver, but more or less tangentially to maintain as far as possible a movement or rotation of the surface of the molten contents, so that the oxidation due to the air will reach all portions of the surface and effectually oxidize accumulations, lessen to a great extent their ability to adhere to the lining of the receiver, and at the same time obtain a scouring action on the lining.

I have found that by using a strong air-blast, preferably of the pressure used in Bessemer converters introduced into the receiver above the surface of the metal and suitably directed, I am enabled to remove accumulations of kish, congealed metal, or skulls, and other accretions incident to receivers, as above mentioned, by a process of combustion or decomposition effected by the oxygen of the air burning out the carbon of the kish and melting the slag and other foreign substances, thus keeping the receiver clear of such obstructions for long periods of time and at the same time increasing the heat of the metal contained in the receiver.

The application of my improvement to an open-hearth steel plant is obvious if we have in lieu of the converters shown in Figs. 1 and 2 open-hearth furnaces of the usual form and provide an air-compressor to furnish the air-blast required.

Having thus described my invention, what

I claim as new therein, and desire to secure by Letters Patent, is—

1. The combination with a line of converters and an air-main to supply them with air, of a pair of receivers for molten metal, means to direct a blast of air onto the surface of the metal, a connection between said means and the air-main, a transfer-ladle, a reciprocable runner between said ladle and receivers, cupolas, means to run metal direct from the cupolas to a receiver and a suitable charging-ladle, substantially as described.

2. The combination with a line of converters and an air-main to supply them with air, of a pair of receivers for molten metal, means located between the receivers and connected to the air-main to direct a blast of air onto the surface of the metal therein, a plurality of cupolas, runners therefrom that unite at their ends, and a movable continuation of said runners, whereby metal can be run directly into a receiver and a charging-ladle to charge molten iron from the receivers into the converters, substantially as described.

In testimony that I claim the foregoing as my invention I have signed my name in presence of two subscribing witnesses.

H. H. CAMPBELL.

Witnesses:
J. B. F. LAURIE,
A. G. FORSTER.